United States Patent Office 3,049,632
Patented Aug. 14, 1962

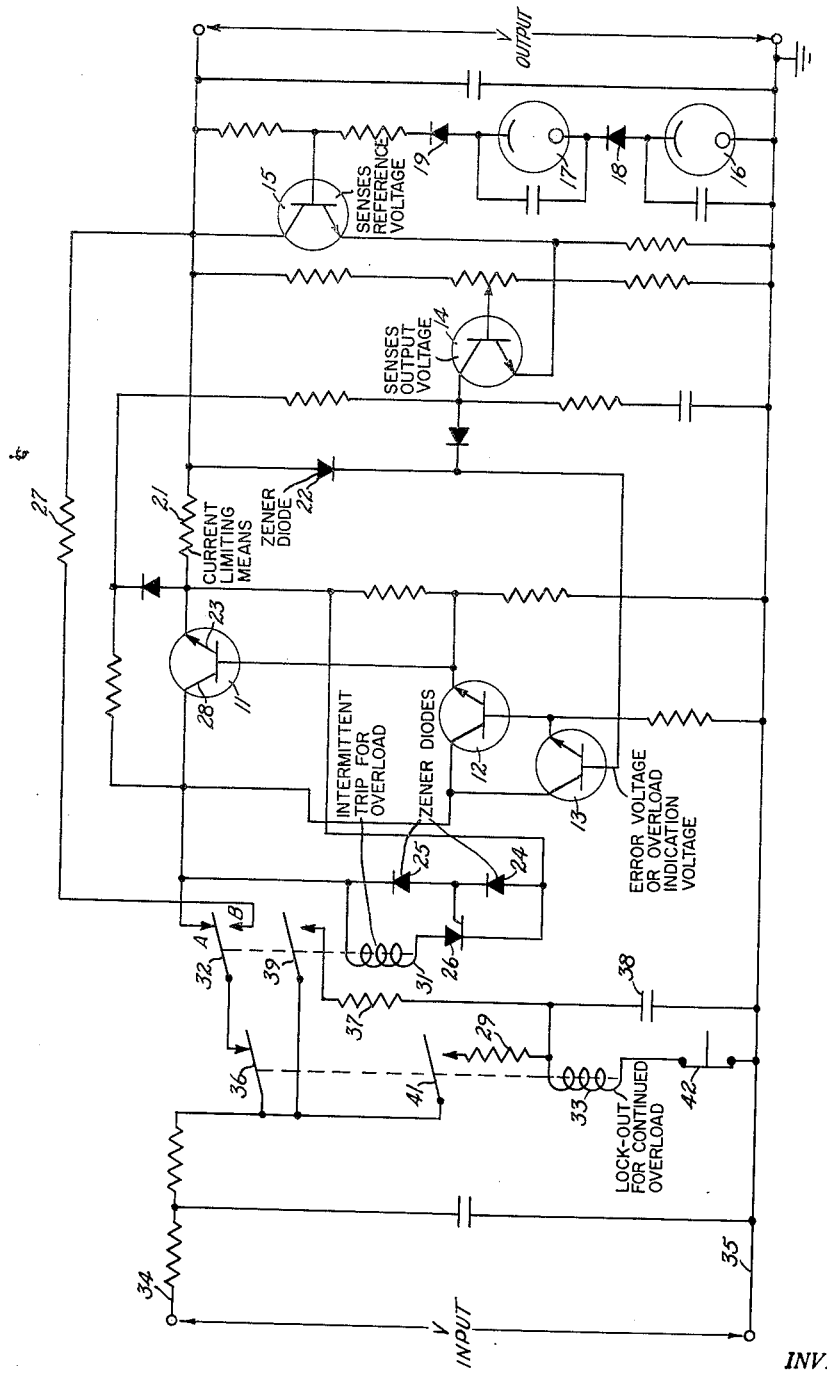

3,049,632
OVERLOAD PROTECTION CIRCUIT
John P. Staples, Indianapolis, Ind., assignor to the United States of America as represented by the Secretary of the Navy
Filed Dec. 29, 1959, Ser. No. 862,723
3 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to an overload protection circuit and more particularly to a circuit for protecting series transistors from destructive overloads of currents and voltages which are the result of shorts, large capacitors, and the like. The present invention has particular application in transistorized power supplies.

In the past, various types of fuses have been employed to protect power supply circuits from excessive surges. However, fuses provide little, if any, protection for series transistors due to the fact that series transistors and fuses break down in approximately the same way. Consequently, the time lag of fuses prevent the protection of transistors under all conditions of overload.

The overload protection circuit of the present invention adequately protects series transistors in a power supply. When the load current in a power supply exceeds a given value, the voltage across a current limiting control resistor becomes great enough for a current limiting control zener to conduct, thus limiting the amount of current that the series transistor will conduct. A further reduction in load resistance causes the voltage across the series transistor to increase until a second zener conducts. When the second zener conducts, a solid state thyratron is also caused to conduct, almost instantaneously. Due to the solid state thyratron action, the voltage across the solid state thyratron drops to a low value and most of the current is shunted through the thyratron and a first relay coil that is connected in series with the thyratron.

The first relay coil actuates a first relay contact to cause the current to be shunted through a bypass resistor and the circuit through the series transistor is opened. A second relay contact is also actuated to charge a capacitor through a charging resistor. However, as there is now no current passing through the relay coil, the first relay contact again closes the circuit and the second relay contacts open. The cycle then repeats until either the overload is removed or until the capacitor charges to a sufficient value to actuate a second relay which shuts off the inputs to the power supply.

One advantage of the overload protection circuit of the present invention is its fast action, that is, in the microsecond range. The time of response can be readily varied by changing the values of the capacitor and the charging resistor. Another advantage of the present invention is that the circuit is only in use during an overload condition.

It is therefore a general object of the present invention to provide an improved overload protection circuit for a transistorized power supply.

Another object of the present invention is to provide a fast acting overload circuit that will protect series transistors.

Other objects and advantages of this invention will be readily appreciated as the same becomes better understood by reference to the following detailed description when considered in connection with the accompanying drawing which is a schematic circuit diagram of a protective system according to this invention.

Referring now to the drawing, there is shown an overload protection circuit incorporated with a transistorized power supply circuit. The particular power supply shown is designed for operation in an airborne radar system. However, it should be understood that the overload protection circuit, which is the subject of the present invention, can be employed in any circuit that uses transistors. In the power supply shown, in order to keep the power dissipation and voltage variations across the series regulating transistors within acceptable limits, the secondary voltages are kept nearly constant by means of a saturable reactor. A series regulating transistor is then employed to provide low ripple and constant output voltage regardless of load current variations. It is this series regulating transistor that is protected from shorts and the like by the overload protection circuit.

In the power supply shown in the drawing, transistors 11, 12 and 13 make up a series emitter follower with transistor 11 handling most of the current. Transistors 12 and 13 are used only for impedance matching so as to make the combination capable of being driven by transistor 14. Transistors 14 and 15 comprise a differential amplifier which compares the output and reference voltages and furnishes an amplified error signal to the base of transistor 13. The differential amplifier minimizes the effect of varying temperature on circuit performance. Transistor 15 is tied to a reference comprised of voltage reference tubes 16 and 17 and zener diodes 18 and 19. Transistor 14 is used to sense the output voltage.

A current limiting control resistor 21 and current limiting control zener 22 are connected to the emitter 23 of transistor 11. When the voltage across resistor 21 becomes too great, zener 22 will conduct and the amount of current flowing through transistor 11 will be limited. A further reduction in load resistance will cause the overload protection circuit to operate.

The overload protection circuit is comprised essentially of zener diodes 24 and 25, solid state thyratron 26, charging resistor 37, capacitor 38, and two relays. The zener diodes 24 and 25 are connected to the emitter 23 and collector 28 of transistor 11. A solid state thyratron 26 has one connection to the common terminal of the emitter 23 and zener diode 24, and another connection to the coil 31 of a relay. A third connection is made to the common terminal of zener diodes 24 and 25. Relay contact 32, which is actuatable by coil 31, is normally closed in the "A" position, and therefore when an overload condition is not present, the solid state thyratron 26 is connected in parallel with the zener diodes 24 and 25. A bypass resistor 27 has one terminal connected to the emitter 23 through resistor 21, and the other terminal is connected to terminal "B" of the relay contact 32. A second relay coil 33 is connectable to leads 34 and 35 through holding resistor 29 and relay contact 41. Relay contact 36, which is normally closed, is actuatable by coil 33. Charging resistor 37 and capacitor 38 are connected in series to input lead 34 and to lead 35 through relay contact 39. Relay contact 39 is normally opened, and is closed when relay coil 31 is energized. Relay contact 41, which is normally open, is actuatable by coil 33, and once locked-in, is held closed by holding resistor 29, until either switch 42 is opened, or until the voltage input is shut off.

During normal operation, that is, when there is no excessive load current, relay contacts 32 and 36 are closed, relay contacts 39 and 41 are open, and the overload protection circuit is inoperative. When the load current exceeds a given value, the voltage across resistor 21 becomes great enough for zener diode 22 to conduct. This action limits the amount of current that transistor 11 will conduct. A further reduction in load resistance causes the voltage across transistor 11 to increase until zener diode 25 conducts. When zener diode 25 conducts, the voltage across the solid state thyratron 26 immediately drops to approximately one volt, and consequently, relay coil 31 is energized to actuate relay contact 32 to the "B" position. Relay contact 39 is also closed.

With relay contact 32 in the "B" position, the input current is shunted through the bypass resistor 27 and with relay contact 39 closed, capacitor 38 is charged through charging resistor 37. However, with relay contact 32 in the "B" position, there is now no current flowing through relay coil 31, and therefore relay contact 32 returns to the "A" position. Relay contact 39 also opens and capacitor 38 is no longer being charged. The cycle then repeats until either the overload is removed or until capacitor 38 becomes sufficiently charged to energize relay coil 33. When relay coil 33 is energized, relay contact 36 opens and the current to the power supply is cut off. Also relay contact 41 locks-in and relay coil 33 remains energized until either the input voltage is cut off or until switch 42 is opened.

The time of response of the overload protection circuit can be varied by changing the value of the capacitor 38. By way of example, a capacitor having a value of 16 microfarads will give a response time of approximately 25 milliseconds under overload conditions. Also by making capacitor 38 sufficiently small, relay coil 33 can be energized almost immediately and relay contact 36 will operate to cut off the current to the power supply.

It can thus be seen that the overload protection circuit of the present invention provides a fast, dependable means for protecting the transistors in a power supply.

Obviously many modifications and variations of the present invention are possible in the light of the above teachings. It is therefore to be understood that the invention may be practiced otherwise than as specifically described.

What is claimed is:

1. In a protective system for transistors; a voltage source; a transistor to be protected from an overload condition having base, collector, and emitter electrodes; switching means connecting said voltage source and said transistor; a zener diode connected between said collector and emitter electrodes for protecting said transistor from an overload condition; a bypass resistor having one end connected to said emitter electrode and another end connected to said switching means; a charging resistor; a charging capacitor having one end connected to said voltage source and the other end connected through said charging resistor to said switching means; and actuating means connected across said zener diode for actuating said switching means to disconnect said voltage source from said transistor and to connect said bypass resistor to said voltage source and to connect said charging capacitor across said voltage source during an overload condition.

2. In a protective system for transistors; a voltage source; a transistor to be protected from an overload condition having base, collector, and emitter electrodes; first and second switching means connecting said voltage source and said transistor; a zener diode connected between said collector and emitter electrodes for protecting said transistor from an overload condition; a by-pass resistor having one end connected to said emitter electrode and another end connected to said first switching means; a charging resistor; a charging capacitor having one end connected to said voltage source and the other end connected through said charging resistor to said first switching means; first actuating means connected across said zener diode for actuating said first switching means to disconnect said voltage source from said transistor and to connect said bypass resistor to said voltage source and to connect said charging capacitor and said charging resistor across said voltage source during an overload condition; and a second actuating means shunted across said charging capacitor for actuating said second switching means when said charging capacitor reaches a predetermined charge thereby disconnecting both said bypass resistor and said transistor to be protected from said voltage source.

3. In a protective system for transistors as set forth in claim 2 wherein said first actuating means connected across said zener diode includes a solid state thyratron connected in series with a relay coil, said relay coil being energized by an overload condition.

References Cited in the file of this patent

UNITED STATES PATENTS

| | | |
|---|---|---|
| 2,473,344 | McCown | June 14, 1949 |
| 2,767,804 | Foley | Oct. 23, 1956 |
| 3,005,147 | Thomas | Oct. 17, 1961 |